(12) United States Patent
Wilson

(10) Patent No.: US 6,213,705 B1
(45) Date of Patent: Apr. 10, 2001

(54) TAPE STORAGE LIBRARY APPARATUS HAVING INTEGRATED CAMERA, PROXIMITY SENSOR, AND REACH SAFE SENSOR

(75) Inventor: Scott D. Wilson, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/382,044

(22) Filed: Aug. 24, 1999

(51) Int. Cl.$^7$ ................................................. B65G 1/137
(52) U.S. Cl. ........................ 414/274; 414/275; 414/807; 700/218; 901/47
(58) Field of Search .................................. 414/274, 275, 414/280, 807; 700/218; 901/47

(56) References Cited

U.S. PATENT DOCUMENTS

| | | | |
|---|---|---|---|
| 4,979,135 | * 12/1990 | Moy | .................................. 901/47 X |
| 4,984,106 | 1/1991 | Herger et al. . | |
| 4,984,108 | * 1/1991 | Grant et al. | ...................... 414/280 X |
| 5,237,468 | 8/1993 | Ellis . | |
| 5,242,259 | 9/1993 | Yeakley . | |
| 5,253,911 | 10/1993 | Egan et al. . | |
| 5,277,540 | 1/1994 | Helms et al. . | |
| 5,303,034 | * 4/1994 | Carmichael et al. | ............ 414/274 X |
| 5,323,327 | 6/1994 | Carmichael et al. . | |
| 5,362,192 | 11/1994 | Dang . | |
| 5,418,732 | * 5/1995 | McFadin | ........................... 414/807 X |
| 5,487,579 | 1/1996 | Woddruff . | |
| 5,546,315 | * 8/1996 | Kleinschnitz | ........................ 700/218 |
| 5,601,391 | * 2/1997 | Gazza | .................................... 414/280 |
| 5,607,275 | * 3/1997 | Woodruff et al. | ................. 414/277 X |
| 5,622,470 | * 4/1997 | Schaefer et al. | ................. 414/275 X |
| 5,661,287 | 8/1997 | Schaefer et al. . | |
| 5,814,171 | 9/1998 | Manes et al. . | |
| 5,993,045 | * 11/1999 | Schmidtke et al. | ................... 700/218 |
| 6,058,337 | * 5/2000 | Akiyama et al. | ..................... 700/218 |

FOREIGN PATENT DOCUMENTS

| | | |
|---|---|---|
| 0 537 923 | 4/1993 | (EP) . |
| 0 640 966 | 3/1995 | (EP) . |
| 98 21033 | 5/1998 | (WO) . |
| 98 26245 | 5/1999 | (WO) . |

* cited by examiner

Primary Examiner—James W. Keenan
(74) Attorney, Agent, or Firm—Brooks & Kushman P.C.

(57) ABSTRACT

A tape storage library apparatus includes a gripper for handling tape cartridges and an integrated camera, proximity sensor, and reach safe sensor operable with a common light source for performing multiple tape cartridge sensing functions. The camera reads the labels of tape cartridges stored in slots of a storage library. The proximity sensor senses the presence and absence of tape cartridges in the slots. The proximity sensor also distinguishes between labeled and unlabeled tape cartridges stored in the slots. The reach safe sensor senses the presence of obstructions in the path of movement of the gripper. The proximity sensor further calibrates the position of the gripper in the storage library. A processor operable with the reach safe sensor calibrates the optical source to ensure proper tape cartridge sensing functions.

20 Claims, 6 Drawing Sheets

TAPE STORAGE LIBRARY APPARATUS HAVING INTEGRATED CAMERA, PROXIMITY SENSOR, AND REACH SAFE SENSOR

TECHNICAL FIELD

The present invention relates generally to storage libraries used in the computer data storage arts and, more particularly, to a tape storage library apparatus having a gripper for handling tape cartridges and an integrated camera, proximity sensor, and reach safe sensor operable with a common light source for performing multiple tape cartridge sensing functions.

BACKGROUND ART

Storage libraries provide large capacity secondary storage to modern computing requirements. Such storage libraries typically employ robotic control mechanisms used by a host computer to physically manage tape media cartridges. A plurality of tape cartridges are stored within a storage library. Each tape cartridge is in a particular slot in the storage library. Each slot is identifiable by its physical position in the storage library. Each tape cartridge is typically uniquely identified by a machine readable label. The storage library maintains inventory information to associate a particular tape cartridge with a particular slot in the storage library. Responsive to a host computer request, a robotic mechanism physically retrieves an appropriate tape cartridge from its associated slot in the storage library, moves the tape cartridge to an appropriate read/write device for processing, and inserts the tape cartridge into the device.

The robotic mechanism typically includes a hand or gripper mechanism positioned on a movable arm. To retrieve a tape cartridge, the arm moves to position the gripper near the slot holding the desired tape cartridge. The gripper then extends and grips the tape cartridge and retracts to take the tape cartridge out of the slot. The arm with the hand gripping the tape cartridge moves to the device and the hand then extends and inserts the tape cartridge into the device. Conversely, when the use of the tape cartridge is complete, the robotic mechanism retrieves the tape cartridge from the read/write device, moves the tape cartridge adjacent its associated slot according to the inventory maintained by the storage library, and inserts the tape cartridge into the storage slot of the storage library ready for future use in response to another host computer request.

A problem with prior designs which contributed to their relatively higher complexity and resultant higher costs relates to the multiplicity and complexity of various sensing mechanisms used to sense several parameters of the operating storage library. A first sensing mechanism determines if there are any obstructions in the path of movement of the gripper which could damage the gripper, the obstruction, or the tape cartridges. A second sensing mechanism independently senses the presence or absence of a tape cartridge in a storage slot. A third sensing mechanism independently reads machine readable labels on tape cartridges (bar code labels or other optically encoded labels). A fourth sensing mechanism independently distinguishes between labeled and unlabeled tape cartridges. A fifth sensing mechanism independently calibrates the position of the robotic mechanism.

What is needed is a simpler, lower cost apparatus to sense the presence of robotic mechanism path obstructions, to sense the presence and absence of tape cartridges in their associated slots, to read the labels of the tape cartridges, to distinguish between labeled and unlabeled tape cartridges, and to calibrate the position of the robotic mechanism.

SUMMARY OF THE INVENTION

Accordingly, it is an object of the present invention to provide a tape storage library apparatus having a gripper for handling tape cartridges and an integrated camera, proximity sensor, and reach safe sensor operable with a common light source for performing multiple tape cartridge sensing functions.

It is another object of the present invention to provide a tape storage library apparatus having a gripper for handling tape cartridges and an integrated camera, proximity sensor, and reach safe sensor operable with a common light source in which the camera reads the labels of tape cartridges stored in slots of a storage library.

It is a further object of the present invention to provide a tape storage library apparatus having a gripper for handling tape cartridges and an integrated camera, proximity sensor, and reach safe sensor operable with a common light source in which the proximity sensor senses the presence and absence of tape cartridges in slots of a storage library.

It is still another object of the present invention to provide a tape storage library apparatus having a gripper for handling tape cartridges and an integrated camera, proximity sensor, and reach safe sensor operable with a common light source in which the proximity sensor distinguishes between labeled and unlabeled tape cartridges stored in slots of a storage library.

It is still a further object of the present invention to provide a tape storage library apparatus having a gripper for handling tape cartridges and an integrated camera, proximity sensor, and reach safe sensor operable with a common light source in which the reach safe sensor senses the presence of obstructions in the path of the gripper in a storage library.

It is still yet another object of the present invention to provide a tape storage library apparatus having a gripper for handling tape cartridges and an integrated camera, proximity sensor, and reach safe sensor operable with a common light source in which the proximity sensor calibrates the position of the gripper in a storage library.

It is still yet a further object of the present invention to provide a tape storage library apparatus having a gripper for handling tape cartridges and an integrated camera, proximity sensor, and reach safe sensor operable with a common light source in which the light source is calibrated to ensure proper tape cartridge sensing functions.

In carrying out the above objects and other objects, the present invention provides a tape storage library apparatus for a storage library containing tape cartridges stored in slots. The apparatus includes a housing having an entry and a gripper for handling tape cartridges. The gripper is movable through the entry between an extended position out of the housing and a retracted position within the housing. The gripper extends to grip a tape cartridge stored in a slot in the storage library and retracts to remove a gripped tape cartridge from the slot. An optical source is mounted to the housing for transmitting optical signals. The optical source transmits optical signals towards the slots in the storage library. A tape cartridge stored in a slot reflects an optical signal transmitted from the optical source as a reflected optical signal having a magnitude above a given magnitude threshold.

A camera is mounted to the housing behind the optical source for sensing reflected optical signals from tape cartridges stored in the slots to read labels attached to labeled tape cartridges. A proximity sensor is mounted to the housing above the optical source for sensing reflected optical signals from the slots in the storage library. Upon sensing a reflected optical signal having a magnitude above the given magnitude threshold the proximity sensor determines the presence of a tape cartridge in a slot. A reach safe sensor is mounted to the housing above the optical source for receiving optical signals from the optical source across the entry. An obstruction in the entry prevents the reach safe sensor from receiving optical signals from the optical source. The reach safe sensor determines the presence of an obstruction in the entry when received optical signals from the optical source are absent.

The proximity sensor upon sensing a reflected optical signal having a magnitude below the given magnitude threshold determines the absence of a tape cartridge in a slot. Preferably, the apparatus further includes a processor for determining the given magnitude threshold as a function of the optical signal received by the reach safe sensor.

A labeled tape cartridge stored in a slot reflects an optical signal transmitted from the optical source as a reflected optical signal having a high magnitude level above the given magnitude threshold. Upon sensing a reflected optical signal having a high magnitude level above the given magnitude threshold the proximity sensor determines the presence of a labeled tape cartridge in the slot. Similarly, an unlabeled tape cartridge stored in a slot reflects an optical signal transmitted from the optical source as a reflected optical signal having a low magnitude level above the given magnitude threshold. Upon sensing a reflected optical signal having a low magnitude level above the given magnitude threshold the proximity sensor determines the presence of an unlabeled tape cartridge in the slot.

Preferably, the gripper is prevented from moving upon the reach safe sensor determining the presence of an obstruction in the entry. The reach safe sensor is disabled while the gripper is moving through the entry of the housing.

Further, in carrying out the above objects and other objects, the present invention provides a method for operating a tape storage library containing tape cartridges stored in slots and a gripper for handling the tape cartridges. The gripper is movable through an entry of a housing between an extended position out of the housing for gripping a tape cartridge stored in a slot and a retracted position within the housing. The method includes transmitting optical signals towards the slots in the storage library from an optical source mounted to the housing. An optical signal having a magnitude above a given magnitude threshold is reflected from a tape cartridge stored in a slot. The reflected optical signals from the slot are sensed with a proximity sensor mounted to the housing above the optical source. The presence of a tape cartridge in a slot is then determined upon the proximity sensor sensing a reflected optical signal having a magnitude above the given magnitude threshold.

The reflected optical signals from the tape cartridges are sensed with a camera mounted to the housing behind the optical source. A label attached to a tape cartridge is then read with the camera. An optical signal is transmitted from the optical source across the entry. The optical signal transmitted across the entry from the optical source is then received with a reach safe sensor mounted to the housing above the optical source. An obstruction in the entry prevents the reach safe sensor from receiving optical signals from the optical source. The presence of an obstruction in the entry is then determined when received optical signals from the optical source by the reach safe sensor are absent.

The advantages accruing to the present invention are numerous. By sharing a common light source the apparatus of the present invention replaces various sensors typically used for multiple sensing purposes. The present invention thereby reduces complexity and associated costs as compared to prior approaches in storage libraries. The present invention has the dynamic range to reliably detect tape cartridges with highly reflective white labels as well as unlabeled low reflective black cartridges. The present invention also compensates for wide intensity variations of the light source.

The above objects and other objects, features, and advantages embodiments of the present invention are readily apparent from the following detailed description of the best mode for carrying out the present invention when taken in connection with the accompanying drawings.

BEST MODES FOR CARRYING OUT THE INVENTION

Figure 1:
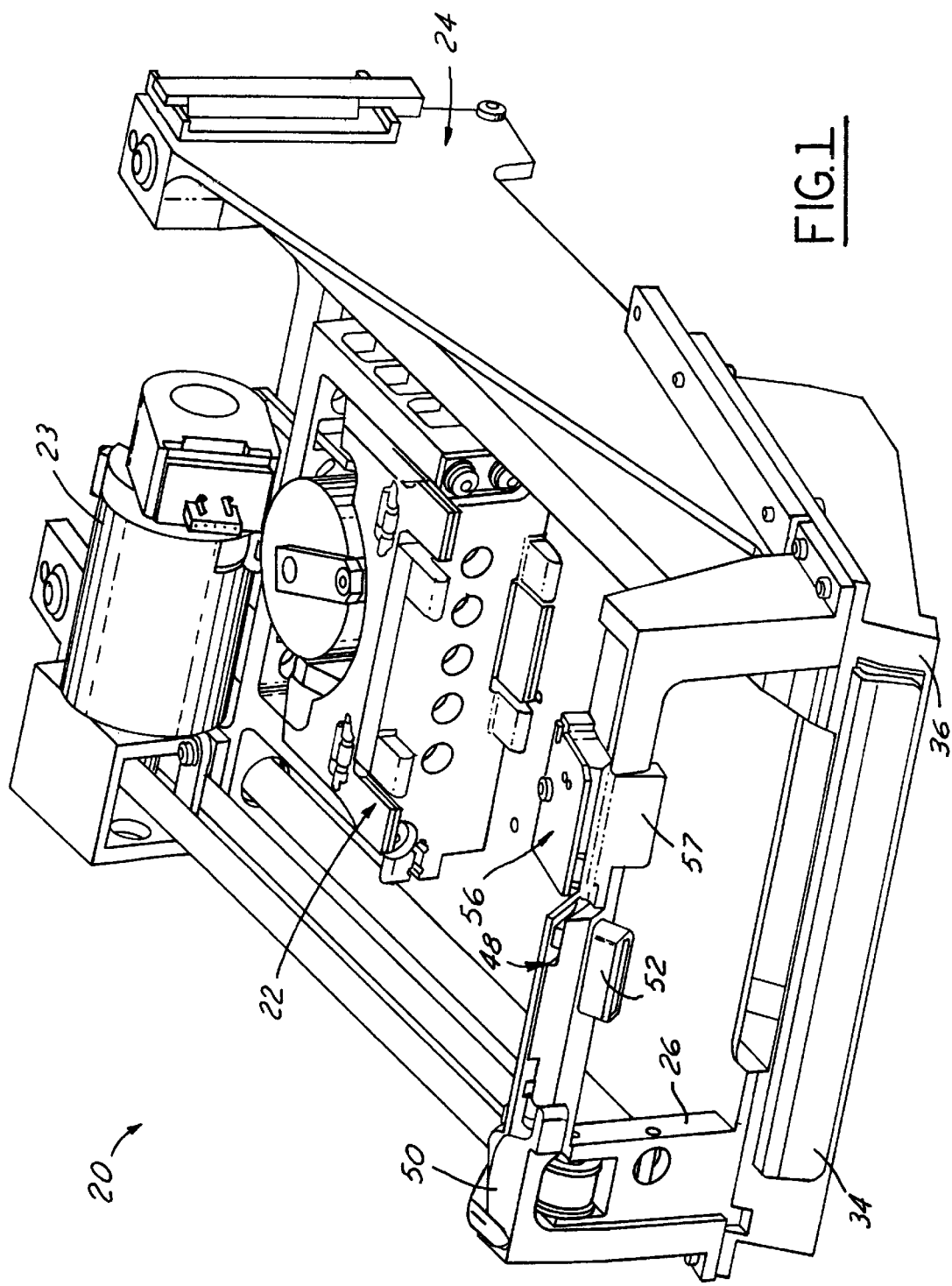
FIG. 1 illustrates a perspective view of the tape storage library apparatus in accordance with the present invention.
Figure 2:
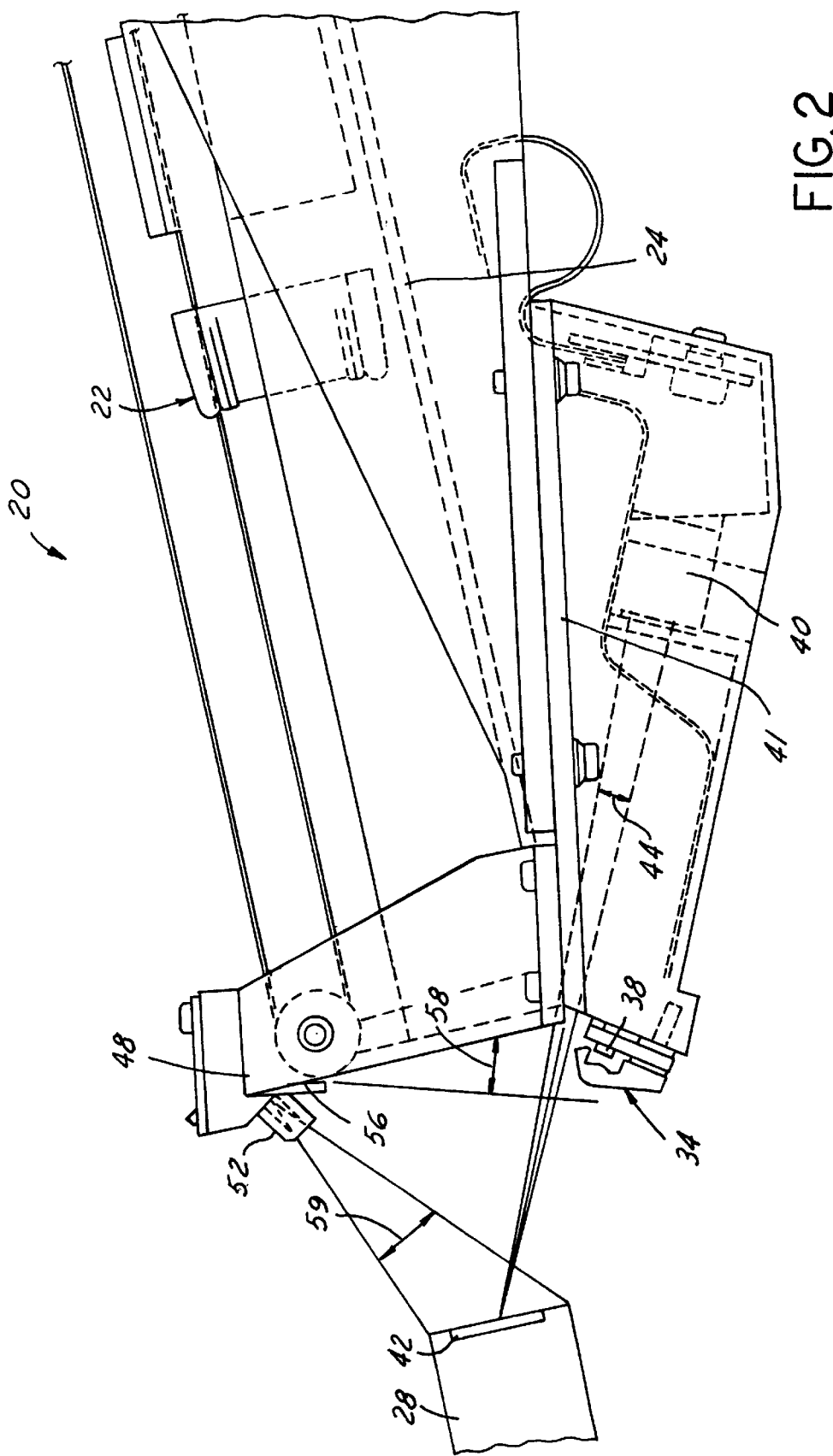
FIG. 2 illustrates a side view of the tape storage library apparatus adjacent a tape cartridge showing the field of views of the camera, the proximity sensor, and the reach safe sensor.
Figure 3:
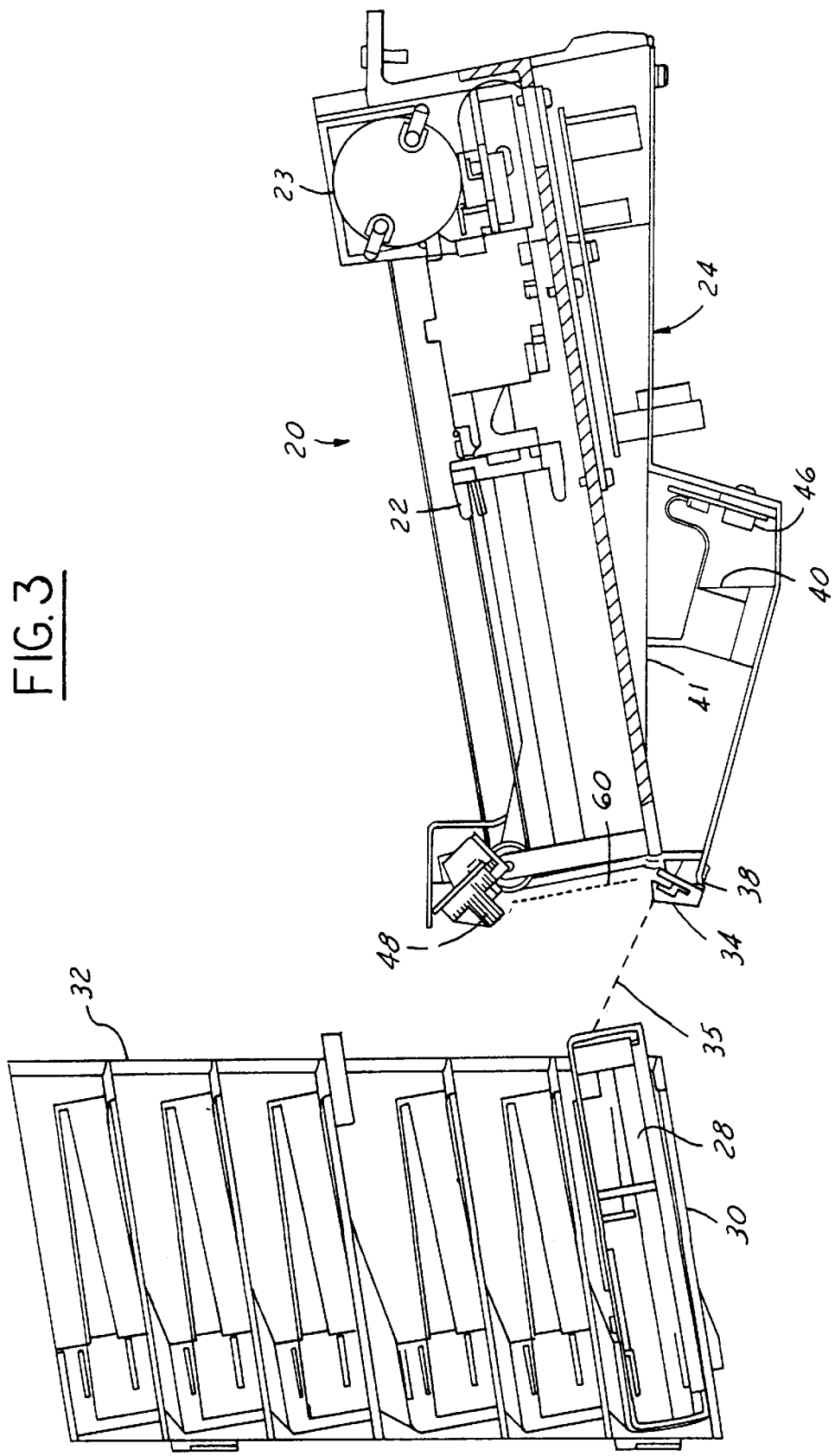
FIG. 3 illustrates a side view of the tape storage library apparatus adjacent a tape cartridge stored in a slot of a magazine showing a first optical signal transmitted from the optical source to the tape cartridge and a second optical signal transmitted from the optical source to the reach safe sensor.
Figure 4:
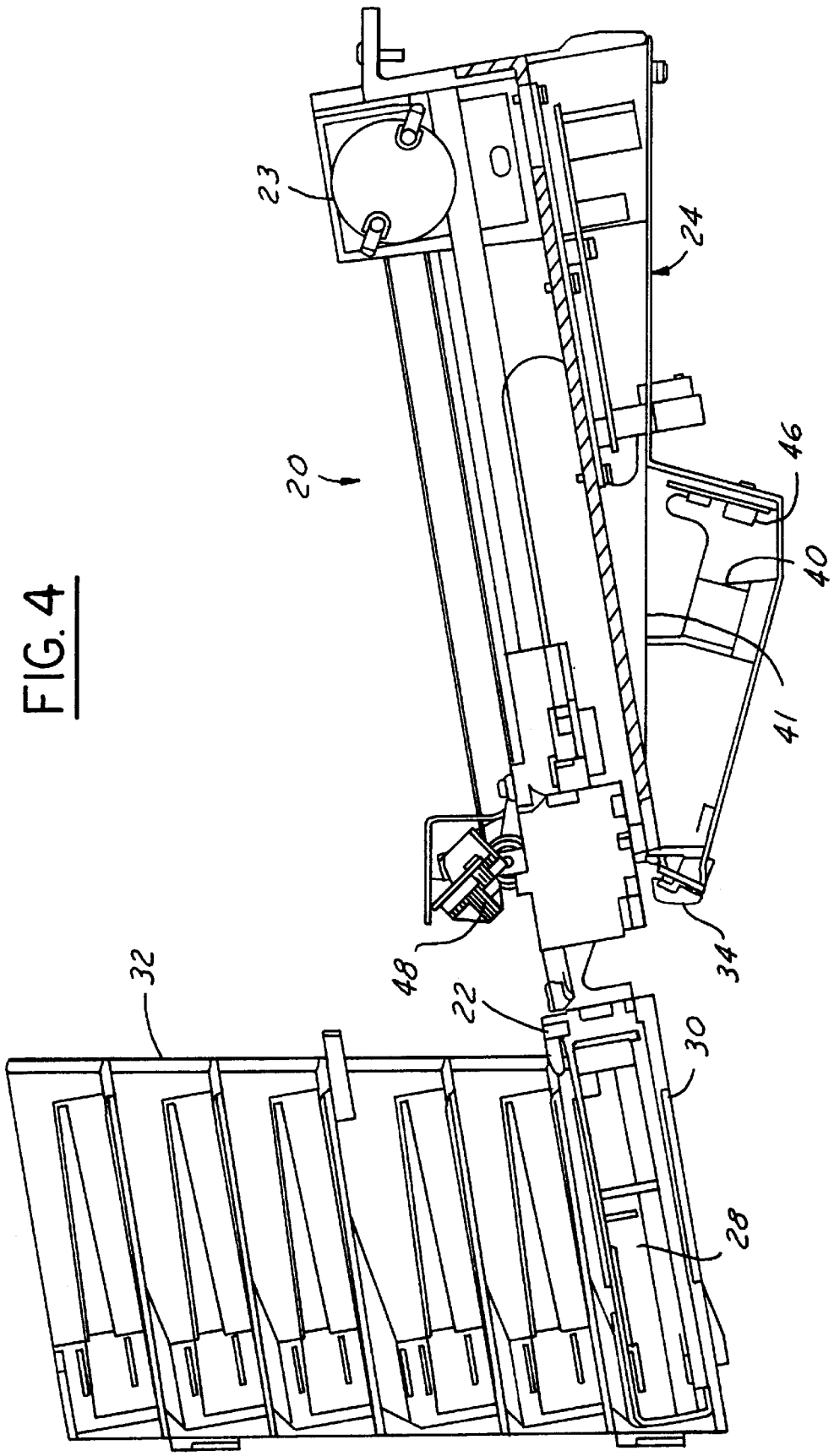
FIG. 4 illustrates a side view of the tape storage library apparatus in which the gripper extends to grip a tape cartridge stored in the slot of the magazine.
Figure 5:
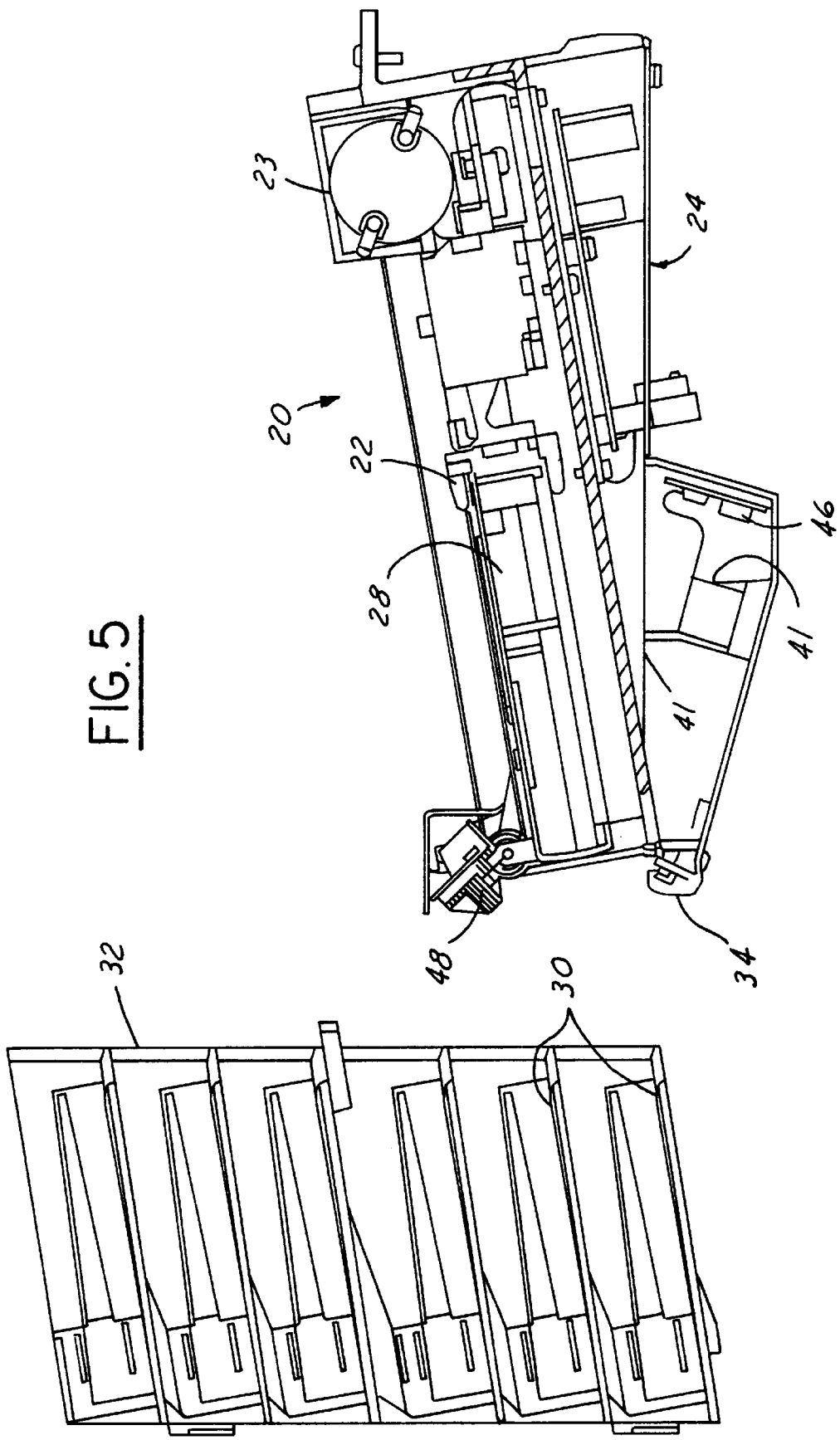
FIG. 5 illustrates a side view of the tape storage library apparatus in which the gripper gripping a tape cartridge retracts to hold the tape cartridge within the housing of the apparatus.

Referring now to FIGS. 1–5, a tape storage library apparatus 20 in accordance with the present invention is shown. Apparatus 20 includes a gripper or robot arm 22 positioned within a housing 24. Housing 24 includes an entry 26. Gripper 22 handles tape cartridges such as tape cartridge 28 stored in a corresponding slot 30 of a tape magazine 32 located within a storage library. Gripper 22 is operable to be driven by a motor 23 for moving through entry 26 of housing 24 between an extended position out of the housing (shown in FIG. 4) and a retracted position within the housing (shown in FIGS. 3 and 5). Gripper 22 extends to grip tape cartridge 28 stored in slot 30 in the storage library and retracts to remove the gripped tape cartridge from the slot for moving the tape cartridge to a read/write device.

Apparatus 20 further includes an optical source 34 mounted to a front surface 36 of housing 24. Optical source 34 includes a light emitting diode (LED) board 38 having a plurality of surface mounting LEDs for transmitting optical signals. Optical source 34 extends angularly upward away from housing 24. Optical source 34 transmits an optical signal towards slot 30 in the storage library along a first optical signal path 35 centered on a filled slot. Tape cartridge 28 stored in slot 30 reflects the optical signal from optical source 34 as a reflected optical signal having a magnitude above a given magnitude threshold.

A camera 40 is mounted to an underside surface 41 of housing 24 behind optical source 34. Generally, camera 40 is operable with optical source 34 for reading labels attached to labeled tape cartridges stored in the slots. In operation, camera 40 senses reflected optical signals from tape cartridge 28 stored in slot 30 to read a label 42 attached to a labeled tape cartridge. Camera 40 has a field of view 44 centered on tape cartridge 28 to sense the optical signals reflected by the tape cartridge. Preferably, label 42 is a bar code label and camera 40 is a line-scan camera in which field of view 44 includes a thin linear field to facilitate bar code type pattern reading. Camera 40 includes a lens which projects an image from the pattern to be read by the camera onto a charge coupled device (CCD) chip 46. CCD chip 46 is a long photosensitive chip with a horizontal slit therein which distinguishes light and dark lines on the projected image. Field of view 44 also extends angularly upward away from housing 24 like optical source 34.

A proximity sensor 48 is mounted to a top surface 50 of housing 24 above optical source 34. Generally, proximity sensor 48 is operable with optical source 34 to sense the presence and absence of tape cartridges in their corresponding slots of magazine 32 in the storage library. Proximity sensor 48 is further operable with optical source 34 to determine if tape cartridges present in the slots are labeled or unlabeled. Proximity sensor 48 is a photo detector for sensing optical signals.

In operation, proximity sensor 48 senses optical signals reflected directly by a tape cartridge stored in a slot and optical signals reflected by an empty slot. Optical signals which are reflected by an empty slot are sensed by proximity sensor 48 as being weak and having a magnitude below a given magnitude threshold because the optical signals bounce around in the empty slot before being reflected towards the proximity sensor. Optical signals which are reflected by a tape cartridge in a slot are sensed by proximity sensor 48 as being strong and having a magnitude above the given magnitude threshold because the optical signals are reflected directly towards the proximity sensor. Proximity sensor 48 includes an opaque material 52 forming a field of view 59 on tape cartridge 28 to sense only the optical signals reflected by the tape cartridge.

Upon sensing a reflected optical signal having a magnitude above the given magnitude threshold, proximity sensor 48 determines the presence of tape cartridge 28 in slot 30. Reflected optical signals received by proximity sensor 48 having magnitudes above the given magnitude threshold indicate the presence of a tape cartridge in a slot. Similarly, upon sensing a reflected optical signal having a magnitude below the given magnitude threshold, proximity sensor 48 determines the absence of tape cartridge 28 in slot 30. Reflected optical signals received by proximity sensor 48 having magnitudes below the given magnitude threshold indicate the absence of a tape cartridge in a slot.

A labeled tape cartridge reflects an optical signal having a high magnitude level above the given magnitude threshold. The reflected optical signal from a labeled tape cartridge has a high magnitude level because labels are typically shiny and white. An unlabeled tape cartridge reflects an optical signal having a low magnitude level above the given magnitude threshold. The reflected optical signal from an unlabeled tape cartridge has a low magnitude level because unlabeled tape cartridges are typically black.

Upon sensing a reflected optical signal having a high magnitude level above the given magnitude threshold, proximity sensor 48 determines the presence of a labeled tape cartridge 28 in slot 30. Similarly, upon sensing a reflected optical signal having a low magnitude level above the given magnitude threshold, proximity sensor 48 determines the presence of an unlabeled tape cartridge 28 in slot 30.

Figure 6:
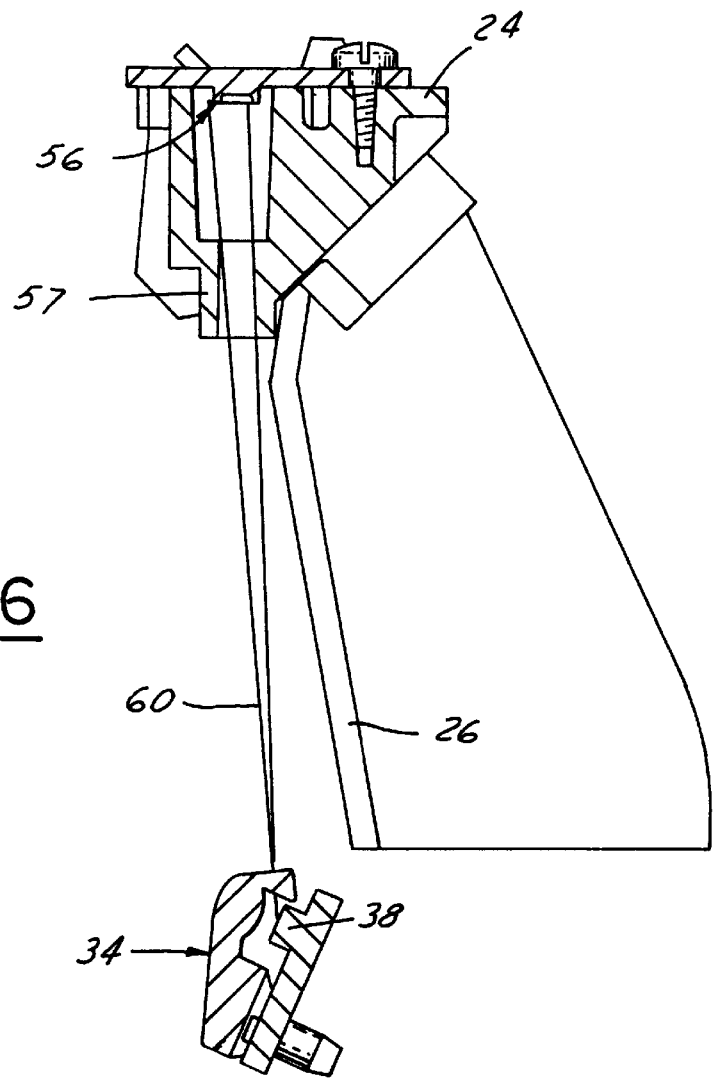
FIG. 6 illustrates the reach safe sensor directly receiving an optical signal from the optical source.

Referring now to FIG. 6, with continual reference to FIGS. 1–5, a reach safe sensor 56 is mounted to housing 24 above optical source 34 adjacent to proximity sensor 48. Reach safe sensor 56 has opaque material 57 forming a field of view 58 centered on optical source 34 for only receiving optical signals from the optical source. Reach safe sensor 56 is a photo detector. Reach safe sensor 56 receives a second optical signal transmitted by optical source 34 along a second optical signal path 60 across entry 26. An obstruction in entry 26 interrupts second optical signal path 60 and prevents reach safe sensor 56 from receiving optical signals from optical source 34. Reach safe sensor 56 determines the presence of an obstruction in entry 26 when received optical signals from optical source 34 are absent.

In operation, gripper 22 is prevented from moving upon reach safe sensor 56 determining the presence of an obstruction in entry 26. Reach safe sensor 56 is disabled while gripper 22 is moving through entry 26 to grip a tape cartridge or pull in a gripped tape cartridge within housing 24.

Figure 7:
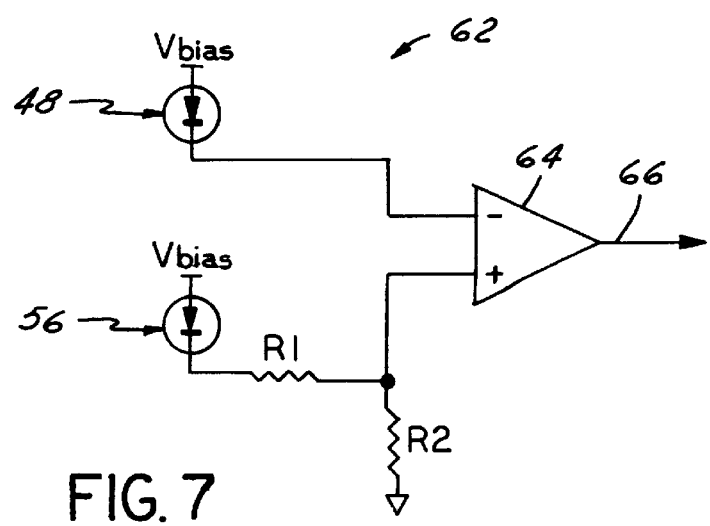
FIG. 7 illustrates an electrical schematic for calibrating the optical source to ensure proper tape cartridge sensing functions.

Referring now to FIG. 7, apparatus 20 includes a processor 62 for determining the given magnitude threshold as a function of the optical signal received by reach safe sensor 56. The optical signals (LED signals) transmitted by optical source 34 have intensities which can vary as much as −50%/+100% causing optical signals received by proximity sensor 48 and reach safe sensor 56 to vary equivalently. This degrades reliability when the reflected optical sensor sensed by proximity sensor 48 is compared to a fixed threshold. Processor 62 addresses this problem by comparing the optical signal received by proximity sensor 48 with a reference signal that is proportional to the optical signal intensity, i.e., the optical signal directly received by reach safe sensor 56 from optical source 34.

Processor 62 includes a comparator 64 for comparing the optical signal received by proximity sensor 48 and reach safe sensor 56. With this scheme, the reference signal varies as the LED intensity varies so that a digital signal 66 provided by proximity sensor 48 in response to the received reflected optical signal remains reliable in spite of intensity variations of optical source 34.

Thus it is apparent that there has been provided, in accordance with the present invention, a tape storage library apparatus having a gripper for handling tape cartridges and an integrated camera, proximity sensor, and reach safe sensor operable with a common light source for performing multiple tape cartridge sensing functions and an associated method that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A tape storage library apparatus for a storage library containing tape cartridges stored in slots, the apparatus comprising:

a housing having an entry;

a gripper for handling tape cartridges, the gripper movable through the entry between an extended position out of the housing and a retracted position within the housing, wherein the gripper extends to grip a tape cartridge stored in a slot in the storage library and retracts to remove a gripped tape cartridge from the slot;

an optical source mounted to the housing for transmitting optical signals, wherein the optical source transmits optical signals towards the slots in the storage library, wherein a tape cartridge stored in a slot reflects an optical signal transmitted from the optical source as a reflected optical signal having a magnitude above a given magnitude threshold;

a camera mounted to the housing behind the optical source for sensing reflected optical signals from tape cartridges stored in the slots to read labels attached to labeled tape cartridges;

a proximity sensor mounted to the housing above the optical source for sensing reflected optical signals from the slots in the storage library, whereupon sensing a reflected optical signal having a magnitude above the given magnitude threshold the proximity sensor determines the presence of a tape cartridge in a slot; and a reach safe sensor mounted to the housing above the optical source for receiving optical signals from the optical source across the entry, wherein an obstruction in the entry prevents the reach safe sensor from receiving optical signals from the optical source, wherein the reach safe sensor determines the presence of an obstruction in the entry when received optical signals from the optical source are absent.

2. The apparatus of claim 1 wherein:

a labeled tape cartridge stored in a slot reflects an optical signal transmitted from the optical source as a reflected optical signal having a high magnitude level above the given magnitude threshold, whereupon sensing a reflected optical signal having a high magnitude level above the given magnitude threshold the proximity sensor determines the presence of a labeled tape cartridge in the slot.

3. The apparatus of claim 1 wherein:

an unlabeled tape cartridge stored in a slot reflects an optical signal transmitted from the optical source as a reflected optical signal having a low magnitude level above the given magnitude threshold, whereupon sensing a reflected optical signal having a low magnitude level above the given magnitude threshold the proximity sensor determines the presence of an unlabeled tape cartridge in the slot.

4. The apparatus of claim 1 wherein:

the proximity sensor upon sensing a reflected optical signal having a magnitude below the given magnitude threshold determines the absence of a tape cartridge in a slot.

5. The apparatus of claim 1 wherein:

the reach safe sensor is disabled while the gripper is moving through the entry.

6. The apparatus of claim 5 wherein:

the gripper is prevented from moving while the reach safe sensor determines the presence of an obstruction in the entry.

7. The apparatus of claim 1 further comprising:

a processor for determining the given magnitude threshold as a function of the optical signal received by the reach safe sensor.

8. The apparatus of claim 1 wherein:

the camera includes a line scan camera for reading bar code labels on the tape cartridges.

9. The apparatus of claim 1 wherein:

the optical source includes a plurality of light emitting diodes.

10. The apparatus of claim 1 wherein:

the reach safe sensor and the proximity sensor are photo detectors.

11. The apparatus of claim 1 wherein:

the proximity sensor has an optical field of view focused on tape cartridges stored in the slots of the storage library for only sensing reflected optical signals from the tape cartridges stored in the slots.

12. The apparatus of claim 1 wherein:

the reach safe sensor has an optical field of view focused on the optical source for only receiving optical signals from the optical source.

13. The apparatus of claim 1 wherein:

the gripper retracts to the retracted position to move a gripped tape cartridge across the entry and into the housing, wherein the reach safe sensor is disabled while the gripper and the gripped tape cartridge are moving through the entry.

14. In a tape storage library containing tape cartridges stored in slots and a gripper for handling the tape cartridges, the gripper being movable through an entry of a housing between an extended position out of the housing for gripping a tape cartridge stored in a slot and a retracted position within the housing, a method for operating the tape storage library comprising:

transmitting optical signals towards the slots in the storage library from an optical source mounted to the housing, wherein an optical signal have a magnitude above a given magnitude threshold is reflected from a tape cartridge stored in a slot;

sensing the reflected optical signals from the slots with a proximity sensor mounted to the housing above the optical source;

determining the presence of a tape cartridge in a slot upon the proximity sensor sensing a reflected optical signal having a magnitude above the given magnitude threshold;

sensing the reflected optical signals from the tape cartridges with a camera mounted to the housing behind the optical source;

reading a label attached to a tape cartridge with the camera;

transmitting an optical signal from the optical source across the entry;

receiving the optical signal transmitted across the entry from the optical source with a reach safe sensor mounted to the housing above the optical source, wherein an obstruction in the entry prevents the reach safe sensor from receiving optical signals from the optical source; and determining the presence of an obstruction in the entry when received optical signals from the optical source by the reach safe sensor are absent.

15. The method of claim 14 wherein:

an optical signal having a high magnitude level above the given magnitude threshold is reflected from a labeled tape cartridge stored in a slot, wherein determining the presence of a tape cartridge in a slot upon the proximity sensor sensing a reflected optical signal having a magnitude above the given magnitude threshold includes determining the presence of a labeled tape cartridge in the slot if the sensed reflected optical signal has a high magnitude level above the given magnitude threshold.

16. The method of claim 14 wherein:

an optical signal having a low magnitude level above the given magnitude threshold is reflected from a unlabeled tape cartridge stored in a slot, wherein determining the presence of a tape cartridge in a slot upon the proximity sensor sensing a reflected optical signal having a magnitude above the given magnitude threshold includes determining the presence of an unlabeled tape cartridge in the slot if the sensed reflected optical signal has a low magnitude level above the given magnitude threshold.

17. The method of claim 14 further comprising:

disabling the reach safe sensor while the gripper is moving through the entry.

18. The method of claim 17 further comprising:

preventing the gripper from moving while the presence of an obstruction in the entry is determined.

19. The method of claim 14 further comprising:

determining the given magnitude threshold as a function of the optical signal received by the reach safe sensor.

20. The apparatus of claim 14 further comprising:

retracting the gripper to the retracted position to move a gripped tape cartridge across the entry and into the housing; and disabling the reach safe sensor while the gripper and the gripped tape cartridge are moving through the entry.

\* \* \* \* \*